June 23, 1953
R. B. MISCIONE
2,643,033
LIQUID DISPENSER
Filed Dec. 2, 1949
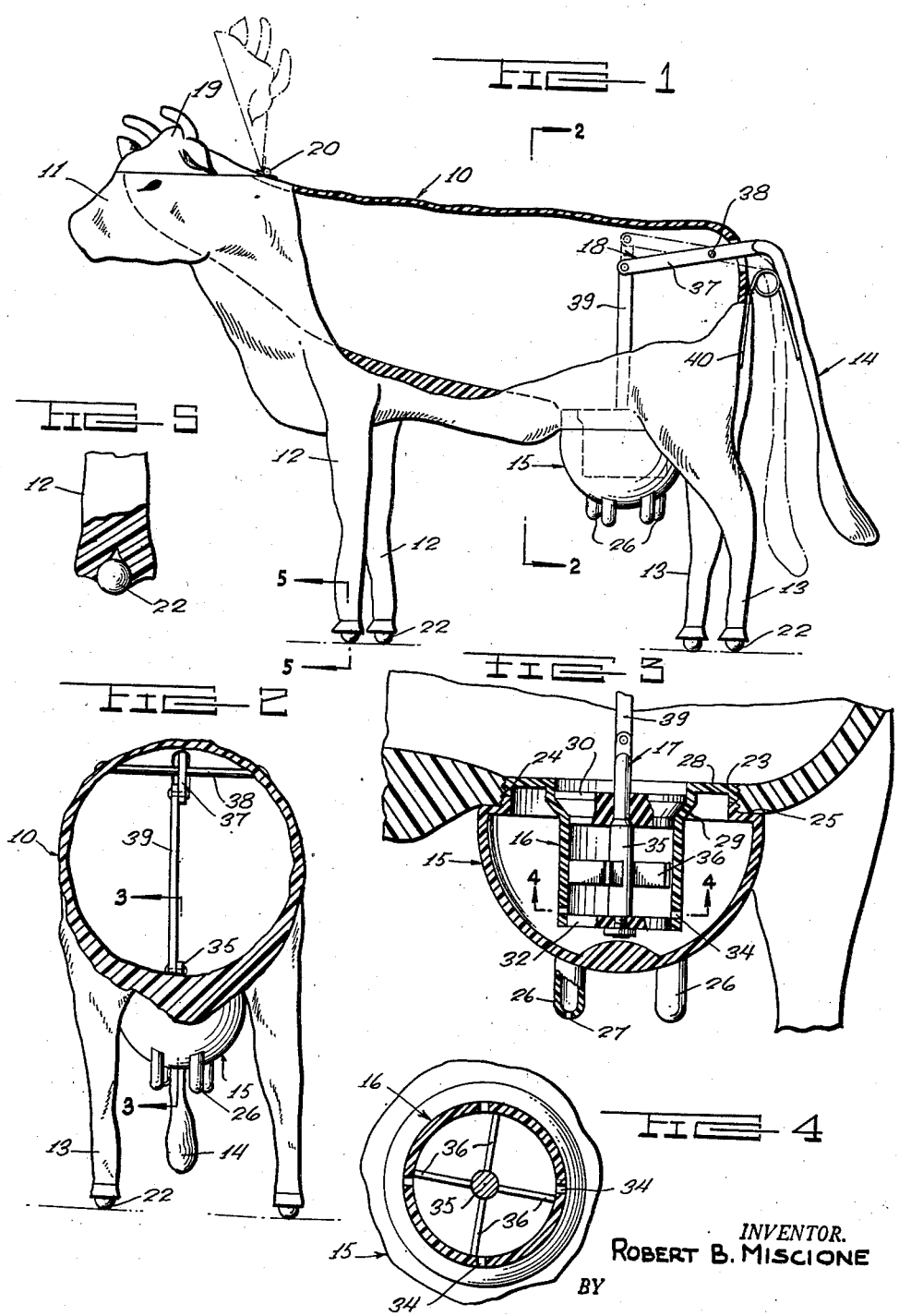
INVENTOR.
ROBERT B. MISCIONE
BY
McMorrow, Berman + Davidson
ATTORNEYS Patented June 23, 1953

2,643,033

UNITED STATES PATENT OFFICE 2,643,033

LIQUID DISPENSER

Robert B. Miscione, Brooklyn, N. Y.

Application December 2, 1949, Serial No. 130,668

1 Claim. (Cl. 222—365)

This invention relates to liquid dispensers, and more particularly to a dispenser in the form of a simulated cow for dispensing milk or cream.

It is among the objects of the invention to provide a novelty milk or cream dispenser which is manually operated to dispense milk or cream in measured quantities and which is in the form of a simulated cow having an udder from which the milk is dispensed, which maintains the dispensing mechanism normally empty and free of milk to prevent clogging of the mechanism and other undesirable effects, which includes a large capacity container or reservoir which is formed directly in the body portion of the simulated animal, and which is easy to fill, which dispenser is easy to clean and sterilize, and is simple and durable in construction, economical to manufacture, and neat and attractive in appearance.

Other objects and advantages will become apparent from a consideration of the following description and the appended claims in conjunction with the accompanying drawing, wherein:

Figure 1 is a side elevation of a liquid dispenser illustrative of the invention, a portion being broken away and shown in cross-section to better illustrate the construction thereof;

Figure 2 is a transverse cross-section on the line 2—2 of Figure 1;

Figure 3 is a cross-section of a fragmentary portion of the dispenser taken on the line 3—3 of Figure 2;

Figure 4 is across-sectional view on the line 4—4 of Figure 3; and

Figure 5 is a cross-sectional view of a fragmentary portion of a supporting leg for the dispenser taken on the line 5—5 of Figure 1.

With continued reference to the drawing, the dispenser comprises, in general, a hollow body 10 simulating a cow and having a head 11, front legs 12, rear legs 13, and a tail 14, a simulated udder 15 detachably secured to the body 10, a valve cylinder 16 in the hollow, simulated udder, valve mechanism 17 in the cylinder 16 and means 18 pivotally mounting the tail 14 on the body and operatively connecting the tail to the valve 17.

The body 10 may be formed of any suitable material, such as synthetic resin plastic, ceramic material or metal, and closely simulates the appearance of a dairy cow in diminished size. The head 11 is provided with a movable portion 19 which is connected at one end to the body by a hinge 20 and can be raised, as indicated in broken lines in Figure 1, to provide a filling opening for the body. The interior of the hollow body constitutes a milk or cream reservoir and no separate container or receptacle is used in the body for this purpose.

Each of the legs is provided, at its lower or outer end, with a ball roller 22, formed of glass or other suitable material, to facilitate movement of the dispenser over a smooth surface, such as a table top.

At the usual location of the udder, the body 10 is provided with a circular, screw threaded opening 23, and the hollow structure 15, simulating the udder, is provided with an externally screw threaded flange or boss 24 which is threaded into the opening 23. The boss 24 is somewhat smaller in diameter than the adjacent portion of the body 10, so that an annular shoulder 25 is provided which bears against the outer side of the body 10 around the opening 23 to limit movement of the structure 15 into the body. If desired, a suitable sealing gasket may be interposed between the body and the shoulder 25.

At its side opposite the boss 24, the udder-simulating structure 15 is provided with four hollow protuberances 26 simulating the teats depending from the udder, and each of these protuberances is provided, in its outer end, with a liquid dispensing aperture 27.

The valve cylinder 16 is formed separately from the udder and is open at both ends. An annular flange 28 surrounds the cylinder at one end of the latter and this flange is peripherally screw threaded into the opening 23 inwardly of the open end of the udder structure 15 so that the cylinder is disposed in the hollow udder structure.

Near its upper end the wall of the cylinder 16 is annularly inclined to provide a tapered valve seat 29, and a valve piston 30 disposed in the cylinder near the upper end of the latter cooperates with this valve seat to open and close the upper end of the cylinder. Near its lower end the cylinder is provided with a series of annularly arranged, spaced-apart ports 34 and a second valve piston 32 is disposed in the cylinder near the lower end of the latter and is movable to open and close these ports.

A valve stem 35 extends through the cylinder and through the valve pistons 30 and 32 and connects these valve pistons together in spaced-apart, substantially parallel relationship. A spider bearing 36 secured in the cylinder, intermediate the length thereof, slidably receives the stem 35 to guide the stem in its movements longitudinally of the cylinder.

The pistons 30 and 32 are connected together in a manner such that when both pistons are moved upwardly until the upper piston 30 leaves the seat 29 and opens the upper end of the cylinder to the interior of the body 10, the lower piston 32 will be moved above the ports 34, so that liquid cannot flow from the lower end of the cylinder. Liquid from the interior of the body will then flow into the cylinder past the valve piston 30 until the cylinder is filled, but cannot flow out of the cylinder. When the valve pistons are subsequently moved, the upper piston 30 will seat on the valve seat 29 closing the upper end of the cylinder, and the lower piston 32 will uncover the port 34 permitting the liquid in the cylinder to flow out through these ports into the interior of the hollow structure 15 from which it flows into the protuberances 26 and out of the dispensing apertures 27.

The means 18 pivotally mounting the tail on the body and connecting the tail to the movable valve structure comprises a lever extension 37 secured to the upper end of the tail and projecting into the body, a pivot pin 38 extending through this lever extension intermediate its length, and pivotally connecting the lever extension to the body, and a link 39 pivotally connected at its upper end to the end of the lever extension 37 remote from the tail 14 and pivotally connected at its lower end to the upper end of the valve stem 35.

With this construction, when the lower portion of the tail is moved toward the hind legs of the device, the valve stem 35 will be raised to permit the cylinder to fill with liquid contained in the hollow body. A suitable spring 40 is interposed between the tail 14 and the adjacent end of the body and when the manual pressure on the tail is released, this spring will resiliently force the tail outwardly away from the body causing the two valve pistons to descend in the cylinder 16 and the liquid to be dispensed from the cylinder through the dispensing apertures 27, as explained above.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

In a measuring valve, a hollow cylindrical valve body open at its ends, one end of said valve body being formed with a valve seat, a spider bearing fixed in and extending across the interior of the body and spaced from the ends of the body, a valve stem extending axially through said body and slidably supported through said spider, said stem being formed with first and second valve pistons spaced therealong and positioned at opposite sides of said spider, the sidewall of said valve body being formed with circumferentially spaced ports located close to the end of the valve body remote from said valve seat, said second valve piston being slidably engaged with the sidewall of said cylindrical valve body and said first valve piston being engageable with said seat, said valve pistons being arranged on the valve stem so that with said first valve piston in a first position in engagement with said seat said second valve piston is below said ports remote from said valve seat and in a second unseated position of said first valve piston said second valve piston is above the ports nearer to the valve seat, the ports being unoccluded by said second valve piston except in the passing of said second valve piston between the two positions of said first valve piston.

ROBERT B. MISCIONE.

References Cited in the file of this patent

UNITED STATES PATENTS

| Number | Name | Date |
|---|---|---|
| 611,653 | Standiford | Oct. 4, 1898 |
| 1,095,542 | Bacon | May 5, 1914 |
| 1,268,820 | Depew et al. | June 11, 1918 |
| 2,106,562 | Bucci | Jan. 25, 1938 |
| 2,135,168 | Cannon | Nov. 1, 1938 |
| 2,243,454 | Collinge et al. | May 27, 1941 |
| 2,511,907 | Flem | June 20, 1950 |